United States Patent [19]
Walton et al.
[11] Patent Number: 4,859,169
[45] Date of Patent: Aug. 22, 1989

[54] WEB PROCESSING BY LONGITUDINAL COMPRESSION USING MATCHED DRIVE DISKS AND RETARDING FINGERS

[75] Inventors: Richard R. Walton, Ten W. Hill Pl., Boston, Mass. 02114; George E. Munchbach, Roslindale, Mass.

[73] Assignee: Richard R. Walton, Boston, Mass.

[21] Appl. No.: 137,074

[22] Filed: Dec. 23, 1987

Related U.S. Application Data

[63] Continuation-in-part of Ser. No. 933,087, Nov. 20, 1986, abandoned.

[51] Int. Cl.[4] .......... B29C 53/28; B31F 1/12

[52] U.S. Cl. .......... 425/336; 162/280; 162/282; 264/282; 264/286; 425/369

[58] Field of Search .......... 162/280, 281, 282; 264/168, 280, 282, 283, 285, 286, 287; 425/224, 336, 369, 396

[56] References Cited

U.S. PATENT DOCUMENTS

| | | | |
|---|---|---|---|
| 623,695 | 4/1899 | Arkell | 264/286 |
| 739,276 | 9/1903 | Allen | 425/336 |
| 1,295,636 | 2/1919 | Tong | 162/281 |
| 1,447,699 | 3/1923 | Wandel | 162/282 |
| 1,548,783 | 8/1925 | Lorenz | 162/282 |
| 1,548,788 | 8/1925 | Lorenz | 162/282 |
| 1,548,789 | 8/1925 | Lorenz | 162/282 |
| 1,550,084 | 8/1925 | Lorenz | 162/282 |
| 1,554,246 | 9/1925 | Wandel | 162/282 |
| 1,571,594 | 2/1926 | Lorenz | 425/336 |
| 1,582,839 | 4/1926 | Lorenz | 162/282 |
| 1,582,840 | 4/1926 | Lorenz | 162/282 |
| 1,582,841 | 4/1926 | Lorenz | 162/282 |
| 1,582,842 | 4/1926 | Lorenz | 162/280 |
| 1,582,843 | 4/1926 | Lorenz | 162/282 |
| 1,627,966 | 5/1927 | Goodlett | 162/282 |
| 1,630,320 | 5/1927 | Wandel | 162/281 |
| 1,667,292 | 4/1928 | Lorenz | 162/280 |
| 1,676,655 | 7/1928 | Lorenz | 162/282 |
| 1,680,203 | 8/1982 | Cannard | 162/280 |
| 1,680,797 | 8/1928 | Lorenz | 162/280 |

(List continued on next page.)

FOREIGN PATENT DOCUMENTS

| | | |
|---|---|---|
| 0047397 | 8/1981 | European Pat. Off. . |
| 127110 | 1/1902 | Fed. Rep. of Germany . |
| 130463 | 5/1902 | Fed. Rep. of Germany . |
| 727763 | 6/1936 | Fed. Rep. of Germany . |
| 1018716 | 10/1957 | Fed. Rep. of Germany . |
| 1093659 | 11/1960 | Fed. Rep. of Germany . |
| 1104972 | 7/1965 | Fed. Rep. of Germany . |
| 1955196 | 11/1969 | Fed. Rep. of Germany . |
| 91122 | 7/1972 | German Democratic Rep. . |
| WO85/04369 | 10/1985 | PCT Int'l Appl. . |
| 752191 | 6/1953 | United Kingdom . |

*Primary Examiner*—Jay H. Woo
*Assistant Examiner*—C. Scott Bushey

[57] ABSTRACT

A machine and method for longitudinally compressing a web under the influence of driving forces provided at a nip line defined by spaced-apart pairs of matched rotating disks and under the influence of retarding forces provided by sets of retarding fingers inserted in the spaces between the disks. In the region close to the nip line, web-contacting surfaces of sets of the fingers diverge in the direction of travel of the web whereby the longitudinally compressed web is subjected to tightest constraint of its thickness at a point longitudinally close to the nip line and downstream therefrom, while still confined, the corresponding sections of web are released from tightest constraint, the diverging surfaces promoting uniform movement of the corresponding oncoming sections of compressed web while enabling relatively steady retarding forces to be transmitted laterally through the web to retard the adjacent sections of the web that are in line with the disks, whereby the longitudinal compressive treatment of both the sections of the web in line with the fingers and the sections in line with the disks can be substantially regular. The retarding fingers extend as cantilevers upstream toward the nip line and are integral extensions of a continuous metal sheet that engages the treated web in its outward movement. A dwell cavity that lightly confines the web can aid in the setting of the treatment, and enable high speed throughout.

32 Claims, 8 Drawing Sheets

U.S. PATENT DOCUMENTS

| | | | |
|---|---|---|---|
| 1,686,388 | 10/1928 | Lorenz | 162/280 |
| 1,689,037 | 10/1928 | Lorenz | 162/280 |
| 1,690,172 | 11/1928 | Lorenz | 162/280 |
| 1,690,411 | 11/1928 | Hudson | 162/281 |
| 1,701,685 | 2/1929 | Lorenz | 162/280 |
| 1,702,166 | 2/1929 | Lorenz | 162/281 |
| 1,751,471 | 3/1930 | Campbell | 162/280 |
| 1,764,676 | 6/1930 | Campbell | 162/281 |
| 2,196,006 | 4/1940 | Benedict | 425/335 |
| 2,224,713 | 12/1940 | Rowe et al. | 428/153 |
| 2,245,014 | 6/1941 | Sherman | 162/117 |
| 2,425,207 | 8/1947 | Rowe | 264/287 |
| 2,623,572 | 12/1952 | Haas | 425/369 |
| 2,793,418 | 5/1957 | Pfau | 28/265 |
| 2,814,332 | 11/1957 | Molla | 425/369 |
| 2,851,206 | 9/1958 | Guenther et al. | 223/28 |
| 2,915,109 | 12/1959 | Walton | 425/369 |
| 2,917,784 | 12/1959 | Spence et al. | 264/168 |
| 2,938,568 | 5/1960 | Cock | 264/286 |
| 2,958,608 | 11/1960 | Barnard | 428/141 |
| 3,022,545 | 2/1962 | Wylde et al. | 264/282 |
| 3,260,778 | 7/1966 | Walton | 264/282 |
| 3,353,222 | 11/1967 | Keel et al. | 28/263 |
| 3,383,449 | 5/1968 | Muller | 264/287 |
| 3,390,218 | 6/1968 | Painter et al. | 264/280 |
| 3,400,193 | 9/1968 | Lefevre et al. | 264/282 |
| 3,639,955 | 2/1972 | Fleissner et al. | 28/269 |
| 3,800,373 | 4/1974 | Fleissner | 28/248 |
| 3,806,406 | 4/1974 | Ely | 162/206 |
| 4,033,709 | 7/1977 | Kroyer | 425/369 |
| 4,090,385 | 5/1978 | Packard | 162/282 |
| 4,142,278 | 3/1979 | Walton et al. | 26/18.6 |
| 4,422,892 | 12/1983 | Plant | 264/282 |
| 4,432,927 | 2/1984 | van Tillburg et al. | 264/282 |

FIG I

WEB PROCESSING BY LONGITUDINAL COMPRESSION USING MATCHED DRIVE DISKS AND RETARDING FINGERS

This application is a continuation-in-part of application Ser. No. 933,087, filed Nov. 20, 1986, now abandoned.

BACKGROUND OF THE INVENTION

This invention relates to web processing of the kind in which the web is longitudinally compressed by driving the web at a nip line formed by pairs of spaced-apart, matched rotating disks and retarding the web by devices inserted in the groove spaced between the disks.

Devices of such disk drive type were suggested more than fifty years ago for making creped products which has more or less irregular, striped form. In Campbell U.S. 1,764,676, pairs of fingers, mounted upstream of the rolls, were shown to protrude into the grooves between the driving disks. The web driven between these fingers was said to fold upon itself alternately in opposite directions from a point of contact with one finger to that with another, and to subsequently pack into the space between the fingers before exiting from the machine. According to that patent, the fingers yieldingly moved or oscillated between a convergent relationship and a relationship in which the fingers were substantially parallel.

It is not known whether such a machine was ever employed commercially. In recent decades different disk drive approaches for longitudinally compressing a web have been used. Walton, U.S. Patent 2,915,109, and Packard, U.S. Patent 4,090,385, show longitudinally compacting a web by feeding it over a roll that has alternating, circumferential ribs and grooves along its length. A flat shoe presses the web against the roll to enable the ribs of the roll to drive the web forward. Then a cylindrical comb (rotating with a peripheral speed lower than the roll) or a fixed comb (whose teeth mate with the grooves of the main roll) lifts the web from the main roll and at the same time compacts it longitudinally. In the latter case, a wide, flexible metal sheet extension from the shoe engages the face of the web opposite the web face that engges the retarder comb, to form with the retarder comb a confining passage for the microcreped material. See also Walton U.S. patent 3,260,778.

Painter, U.S. Patent 3,390,218, shows pleating a web using one smooth roll and a second smaller diameter roll having alternating ridges and grooves. A third slower moving smooth retarder roll is held against the first smooth roll in a converging relationship to force the web back toward the nip, to cause pleating. In one example of this machine, a finger member, mounted upstream of the grooved roll, protrudes into the grooves to form one side of the longitudinal compression zone at the nip, preceeding the third roll.

In Cannard, U.S. Patent 1,680,203, a web is shown being creped by passing it into the nip between two drive rolls each having disks alternating with spacer elements. After passing through a relatively long confining passage, the web is engaged by slower rotating rolls which cause the web to crowd together to form the crepes in the long passage. The long passage is bounded by two sets of long, thin presser members, the forward ends of which are tapered and disposed in the spaces between the disks of the drive roll.

In a different type of machine that drives the web by a nip formed by two smooth rolls, two wide, curved blades mounted downstream in opposition to the nip have provided a retarding passage into which the web is forced and caused to compact, Walton et al., U.S. Patent 4,142,278.

SUMMARY OF THE INVENTION

The invention features a machine and method for longitudinally compressing a web under the influence of driving forces provided at a nip line defined by spaced-apart pairs of matched rotating disks and under the influence of retarding forces provided by sets of retarding fingers inserted in the spaces between the disks. An important feature of the invention is that, in the region close to the nip line, web-contacting surfaces of the sets of fingers diverge in the direction of travel of the web whereby the longitudinally compressed web is subjected to tightest constraint of its thickness at a point longitudinally close to the nip line, and downstream therefrom, while still confined, the corresponding sections of web are released from tightest constraint, such diverging surfaces promoting uniform movement of the corresponding oncoming sections of compressed web while enabling relatively steady retarding forces to be transmitted laterally through the web to retard the adjacent sections of the web that are in line with the disks, whereby the longitudinal compressive treatment of both the sections of the web in line with the fingers and the sections in line with the disks can be substantially regular.

Preferred embodiments of the invention include the following features. At least one and preferably both of the opposed surfaces of sets of fingers are convexly curved in the region close to the nip line. The radius of curvature of each of the convexly curved fingers is of the order of the radius of the disk alongside which it lies; fingers of at least one set are structurally supported from a point downstream of the nip, the fingers protruding upstream therefrom, with their tips disposed entirely within the respective spaces, below the path of travel of the web. Fingers of both sets are mounted in the manner just described. Beginning at a region spaced downstream substantially from the nip line at which region the space between the fingers has widened so that at least a major portion of face-wise pressure upon the treated web has been relieved, there is defined an elongated dwell cavity in which surfaces engaging the web become substantially parallel.

According to another aspect, the invention features a machine and method that employs two side-by-side rolls rotating respectively in opposite directions abut two spaced apart axes; each roll has larger diameter and smaller diameter segments along its length, and the larger and smaller diameter segments of the two rolls are matched to form a series of relatively shallow driving nips along a nip line, alternating with relatively deep non-driving spaces; the larger diameter segments impose face-to-face compressive forces and longitudinal driving forces on the corresponding regions of the web which pass through the nips; the non-directly driven web regions are driven indirectly by the larger diameter roll segments acting via forces transmitted through the substance of the web from the directly driven web regions to the non-directly driven web regions; a closely disposed retarding means in the form of pairs of generally divergent fingers slidably engaging the web are located to apply longitudinal retarding forces (opposite to the driving forces) on both faces of the non-directly driven regions immediately as they emerge from the nip line to produce immediate, continual shortening of the emerging web, the shortened web thereafter being sjubect to a zone of less constraint, the non-driving spaces adjacent the web permitting reorientation of the non-directly driven web regions during the shortening with less face-to-face compression than for the driven web regions; and the driven web regions being retarded indirectly by the closely disposed divergent fingers acting via forces transmitted through the substance of the web from the non-directly driven web portions, to cause the driven web regions to undergo their immediate, regular longitudinal shortening.

Preferred embodiments of the invention also include the following features. Each larger diameter segment has a peripheral driving surface that is narrower in width than the width of the space between the peripheral driving surface and the peripheral driving surface of the next adjacent larger diameter segment. The width of the peripheral driving surface is about one half or less than the width of the space, preferably the width of the spaces being about 0.10 inch and the width of the driving surfaces being about 0.05 inch or less. The peripheral driving surfaces bear an enhanced friction treatment, such as parallel knurling cuts or fine particle plasma coating. The peripheral driving surface of each larger diameter segment is cylindrical and is narrower axially than the full axial width of the segment, and a pair of smooth tapered shoulders is provided on opposite sides of the driving surface.

Preferred embodiments of the invention also include the following features. The stationary finger-form retarding members are cantilevered and each has, exposed for contact with a face of one of the non-directly driven web regions, a surface having a width less than the space between the corresponding adjacent larger diameter segments. Each finger-form member rests within one of the non-driving spaces of one roll and includes a second sruface (opposite the web contacting surface) that is spaced away from the peripheral surface of the associated smaller diameter segment. On each side of the web, the finger-form members are integral upstream extensions of a continuous retarder element which extends across the width of the web; the finger-form members of each element are interdigitated in the non-driving spaces of the respective roll, and the contact surfaces of the two elements are separated by a space, during operation, to permit the passage of the non-directly driven portion of the web. In some embodiments, downstream portions of the slidable contact retarder means define pathways for passage of the non-directly driven web regions that, after the initial divergence, remain shallow so that the contacting means maintains a degree of face-to-face compression upon the reoriented and compacted non-directly driven web regions as they pass via the pathways. In other embodiments, the divergence continues until the pathways are wide enough to minimize the face-to-face compressive forces applied to the non-directly driven web regions. The retarding means define short compaction cavities very close to the nip in which substantially all reorientation and compaction of the non-directly driven web regions can occur. During operation, the retarder fingers are held at substantially fixed distances from the plane on which the roll axes lie and remain steady during operation. The retarders are relatively rigid in the direction perpendicular to the faces of the web. In some embodiments, the retarding fingers terminate in flat ends; in other embodiments, in tapered or rounded ends. In important embodiments, the retarders are both supported from the downstream side.

Preferred embodiments of the invention also have the following aspects. A dwell cavity having a pair of cavity faces is located at the outfeed side of the nip beyond the restriction and divergent passage provided by the fingers. The faces are subjected to a temperature differential along the length of the dwell cavity, with higher temperatures nearer the nip; the faces are maintained at a uniform or increasing spacing, and are subjected to even or decreasing pressure along the length of the dwell cavity. One face is integral with the retarding means; the other includes a plate attached to the retarding means.

The relative proportion of the web which is driven can be made small, thus minimizing the total area affected by face-to-face compression where such may be disadvantageous. Driving is aided by the knurling or plasma coating. The smooth shoulders adjacent the driving surfaces provide a transitional region that can avoid tearing of the web. The compaction cavity provides space for very substantial compaction and reorientation in both directions from the plane of the web. The dwell cavity can impart to the finished web a smooth, compact quality, reduce spontaneous expansion of the finished web, enhance permanence of the treatment, and permit higher speeds of treatment.

The invention can impart useful properties to a wide variety of webs by causing substantial, uniform facewise reorientation and longitudinal compaction along a series of parallel longitudinal web regions. The products are characterized in general in being of very regular, striped form. Certain material, e.g. thick bats of absorbent fibers, are compacted with no folds or undulations in the portions moving between the fingers. Knitted goods may be treated to provide a uniform, ribbed appearance, e.g. useful as thermal underwear. Thinner and denser materials are provided with highly uniform, microcrepe in the zones of the fingers, without superficial folds or crepe.

Other advantages and features will become apparent from the following description of the preferred embodiments, and from the claims.

DESCRIPTION OF THE PREFERRED EMBODIMENTS

We first briefly describe the drawings.

DRAWINGS

STRUCTURE AND OPERATION

Figure 1:
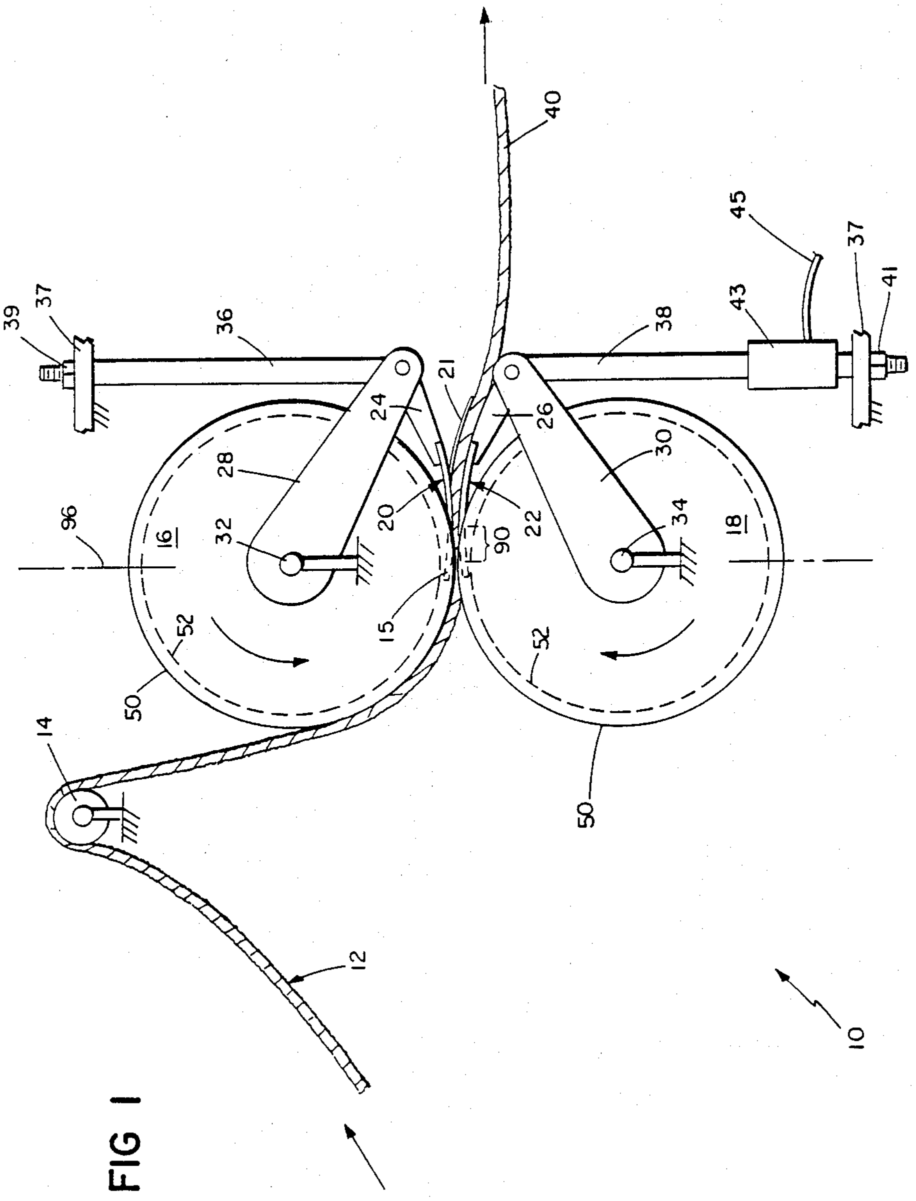
FIG. 1 is a side view of elements of a web processing machine.

Referring to FIG. 1, in web processing apparatus 10, a continuous web 12 is led from a supply roll (not shown) over a guide roll 14 into the nip region 15 between two drive rolls 16, 18 that are driven at the same speed in opposite directions (as indicated by the arrows). On the outfeed side, a pair of divergent retarders 20, 22 (one of which includes a dwell plate 21) are positioned to retard the motion of web 12 in a manner to be described in more detail below. The processed web 40 is delivered to a take-up roll (not shown).

Retarders 20, 22 are respectively held in brackets 24, 26 which are in turn mounted at each end of the rolls on respective supports 28, 30. Each support 28, 30 is mounted rotatably at one end on a shaft 32, 24 of one of the rolls 16, 18, and is supported at the other end by a supporting rod 36, 38. Rods 36, 38 occupy substantially fixed positions during a processing run but their lengths (and hence the precise positions of retarders 20, 22 relative to the nip region) can be adjusted by a conventional adjustment mechanism (not shown). The ends of rods 36, 38 are threaded and removably held to the frame 37 by nuts 39, 41 so that, by releasing the nuts, the rods can be released from the frame and the retarders can be pulled away from the nip region for servicing. Rod 38 includes a pneumatic cylinder 43 supplied by a pressure line 45, which enables resilient yielding of the rod under load to provide longitudinally resilient support to retarder 22. (A feature that is used to enable self-adjustment of the retarder at start up, as web 12 is initially compacted.)

Figure 2:
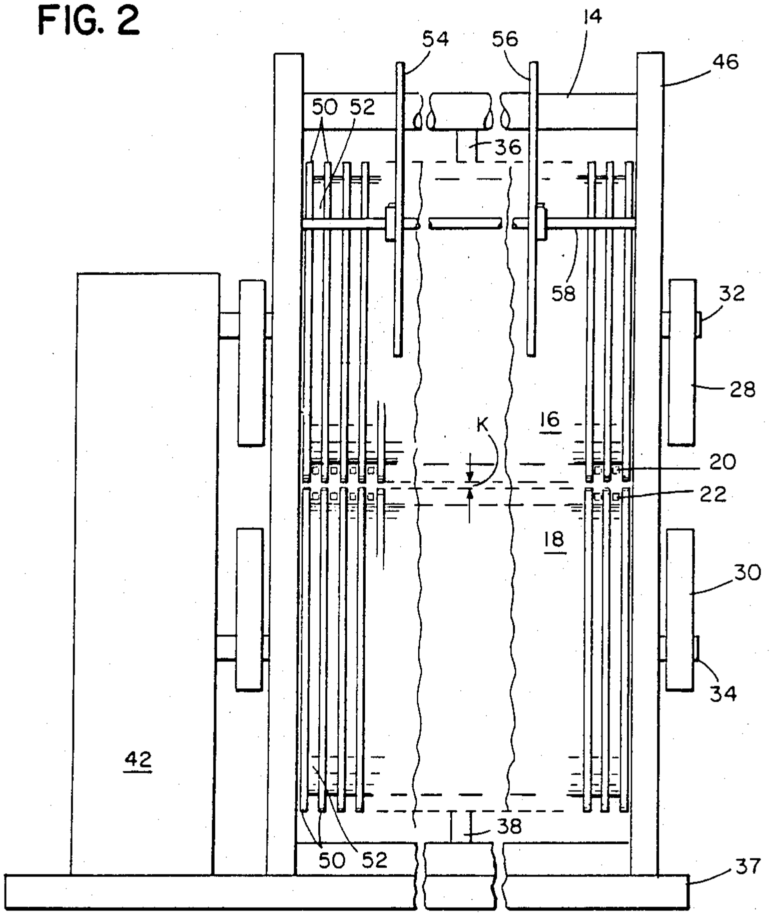
FIG. 2 is a view from the infeed side of the machine.

Referring to FIG. 2, rolls 16, 18 are driven at a selected speed by a conventional motor and driving mechanism 42 mounted on frame 37. Rolls 16, 18 are supported in a metal frame 46 (also mounted on frame 37) with the axes of the two rolls parallel. The spacing between the two rolls can be adjusted by conventional means (not shown) but the spacing (and hence the nip height) is generally held fixed during a processing run. Each roll 16, 18 is milled to form a succession of identical larger diameter (4") disks (segments) 50 alternated with a second set of identical disks (segments) 52 of somewhat smaller diameter (3¼) than disks 50. At the nip region, each roll 16, 18 thus presents a series of alternating lands (formed by the peripheral surfaces of the larger disks 50) and valleys (formed by the peripheral surfaces of the smaller disks 52). The respective axial positions of rolls 16, 18 are matched, that is the lands of roll 16 are opposite the lands of roll 18 and the valleys of roll 16 are opposite the valleys of roll 18.

In order to guide webs of different widths into the central part of the nip, a pair of planar plates 54, 56, the planes of which are arranged perpendicular to the roll axes, are adjustably mounted on a rod 58 attached to frame 46. The width of the opening between plates 54, 56 can then be adjusted to accommodate the width of web 12. Each plate 54, 56 is thin enough to slip between adjacent larger disks 50 to position the web such that matched lands are located at each edge of the web as it is processed.

Rolls 16, 18 contain conventional electric heating elements (not shown) that can be controlled to bring the rolls to a desired even temperature appropriate for processing the particular web being used.

Figure 3:
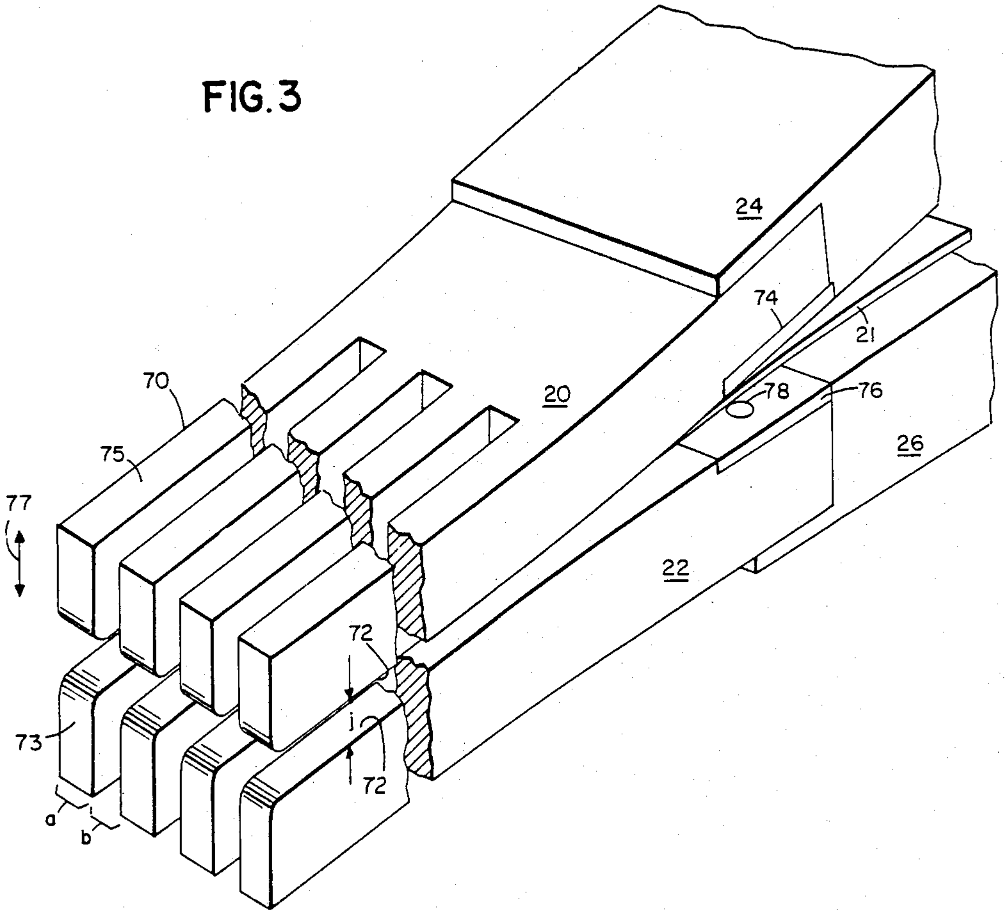
FIG. 3 is a diagrammatic, isometric cutaway partial view of the retarders of the machine.
Figure 4:
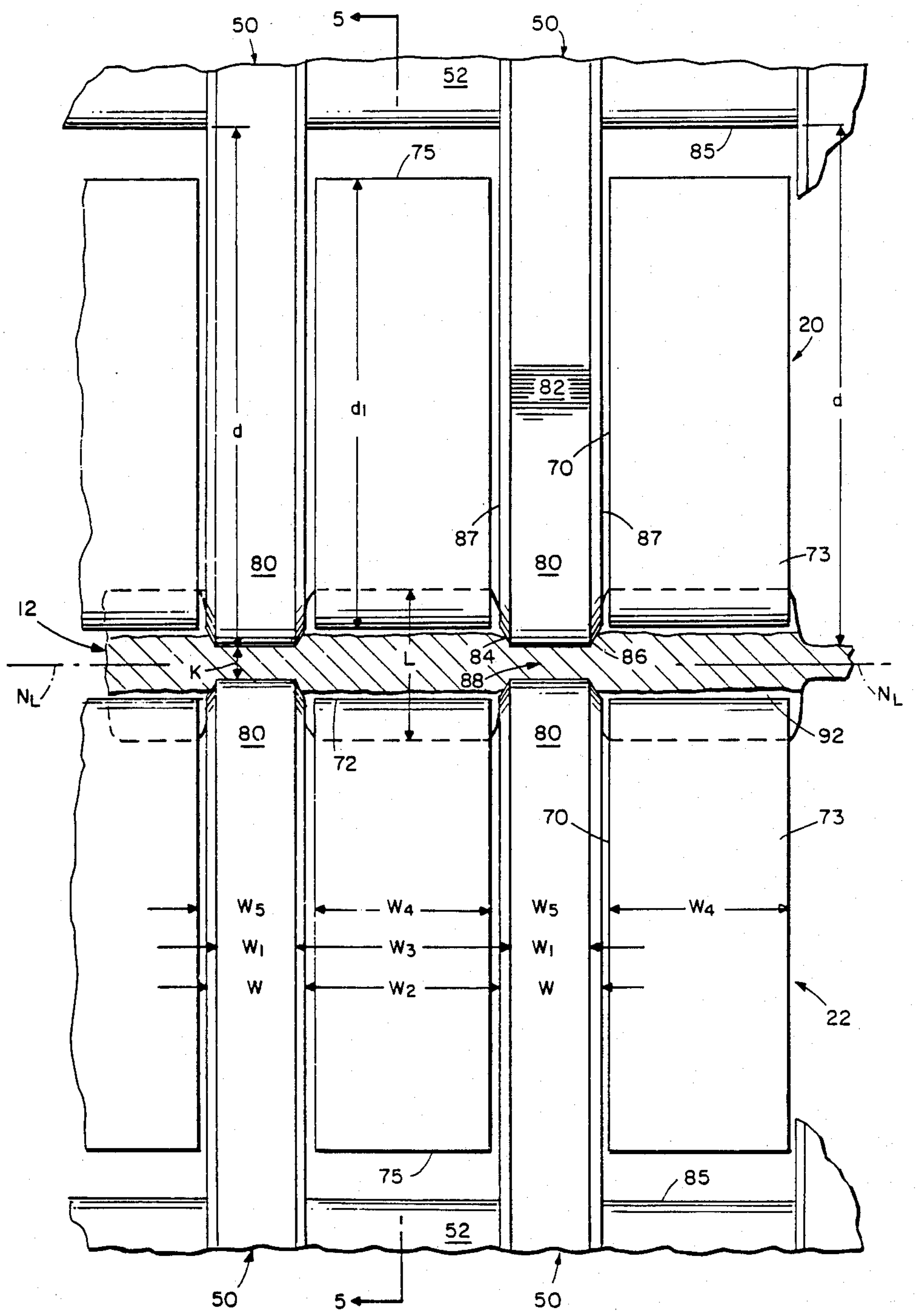
FIG. 4 is an enlarged view from the infeed side of a representative portion of the nip of the machine.

Referring to FIGS. 3 and 4, each of the two retarders 20, 22 is cut from a sheet of ¼" thick metal to form a row of parallel evenly spaced retarder fingers 70. Each finger 70 has a gently convexly curved retarding surface 72 that slidably contacts one face of the web and an end face 73 that is substantially perpendicular to the plane of the web. The width $W_4$ of each finger 70 (e.g., 0.090") and the width $W_5$ of the space between adjacent fingers 70 (e.g., 0.060") are such that successive fingers 70 nest within successive valleys along the corresponding rolls 16, 18. Each finger 70 also has a back surface 75, parallel to surface 72, which, during operation, faces (but does not bear against) the peripheral surface (85 in FIG. 4) of the smaller diameter disk associated with that finger. Each retarder 20, 22 is attached to its associated bracket 24, 26 by a plate 74, 76 and screws or rivets 78. Each retarder 20, 22 is rolled to have a radius of curvature of about 4" along the length from its end to the brackets 24, 26, with the two retarders curving away from each other toward their bracketed ends. Fingers 70 are relatively rigid in the direction indicated by arrows 77. Dwell plate 21 (a 0.020" thick blue steel plate that is coextensive with retarder 20 in the direction of the roll axes) is welded along one of its edges to the bottom face of retarder 20, at a distance of about 2" from the nip. The precise location of plate 21 relative to the nip, for a given treatment of a given web, is determined by trials by moving the plate in and out until the best performance is obtained. The bottom surface of plate 21 and the upper surface of retarder 22 and its support define a dwell cavity whose function is described in greater detail below.

Referring to FIG. 4, each finger 70 has a depth $d_1$, (e.g., ¼") that is about two-thirds the depth d (e.g., ⅜") of the valley in which it nests. Each larger diameter disk 50 is machined to have a central peripheral driving track 80. The total width, W, of disk 50 is e.g., 0.050", the width, $W_1$, of the track 80 is between 0.025" and slightly less than 0.050" (e.g., 0.045"), and the total space, $W_3$, between tracks is between 0.100" and 0.150" (e.g., 0.110"). Track 80 is cylindrical , its surface is parallel to shafts 32, 34 (FIG. 2), and it bears a rigid friction surface formed either of parallel knurling 82 spaced at intervals of, e.g., 80 lines per inch, or by plasma coating of very fine abrasive particles, e.g. of tungsten carbide. The friction surface is chosen to enhance the drive capability of the nip while still accurately maintaining the geometry of the nip, which forms the leading side of the treatment cavity, and permitting the driven portions of the web to slide upon the roll surface when it is shortened in the treatment cavity. On either side of track 80 is a smooth convex shoulder 84, 86 which is contoured to meet the side surface 87 of the larger diameter disk 50. Corresponding lands of the matched rolls 16, 18 (FIGS. 1, 2) thus form (a) a series of relatively shallow driving nips 88 along nip line $N_L$, in which the web 12 is pinched (compressed by face-wise forces) and driven by longitudinal forces toward the outfeed side, and (b) an intervening series of relatively deep non-driving spaces 92 between successive driving nips. Non-driving spaces 92 provide space on both sides of web 12 for its reorientation and compaction. The divergent retarders 20, 22 are positioned at the outfeed end of non-driving spaces 92 and resist the motion of web 12.

Figure 5:
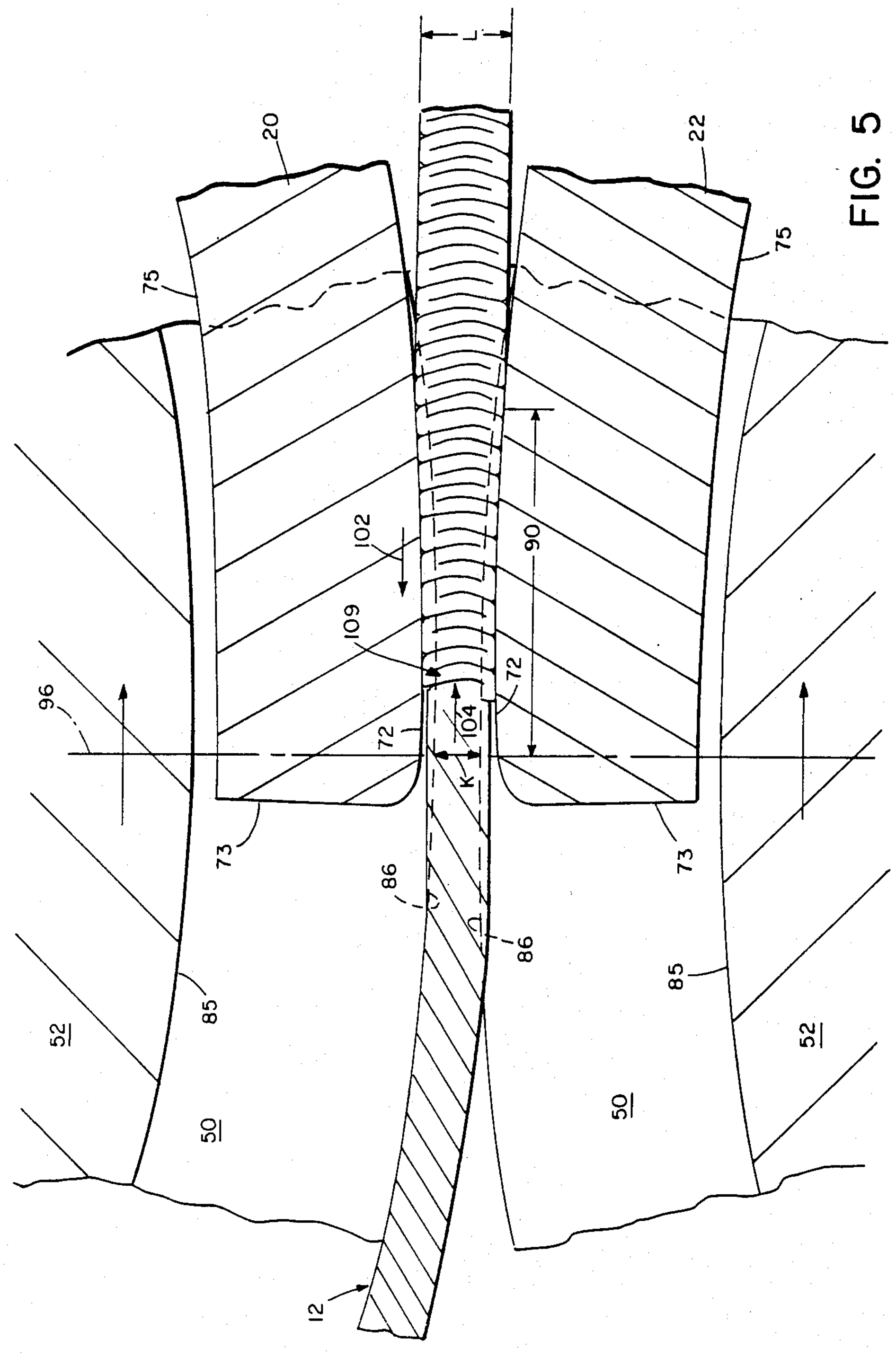
FIG. 5 is a diagrammatic, side sectional view taken at 5—5 in FIG. 4.

Referring to FIG. 5 (which does not show the preferred dwell plate), the processing of web 12 occurs in a short length region 90 beginning approximately at the nip region of the two rolls (at the line of centers between the axes of roll shafts 32, 34) and ending at a point a short distance (i.e., a distance far shorter than the radius of either of the rolls 16, 18) on the outfeed side slightly beyond the point of initial contact of the web with the divergent retarding fingers. The processing is accomplished by the driving forces applied at the driving nips and the interdigitated retarding forces applied at the non-driving spaces, combined with the configurations a of the driving nips, the non-driving spaces, and the divergent retarders, and the positioning of the retarders relative to the rolls. Because of the divergent character of the retarding surfaces, the closest restriction presented to the oncoming web and the maximum frictional drag is near the beginning of the treatment region while portions of the treated web downstream from there are subjected to less drag. The oncoming web undergoes its longitudinal compression thickening and shortening at the beginning of the region where the aggregate retarding force is greatest and the drag of the remaining part of the channel tends to buffer the progressive flow of the compressed web with decreasing force as the web progresses, this assures even progress of the web. Such stability of the rate of progress of the treated web translates to a stable condition also at the point of initial treatment so that the entire compressive treatment of the non-driven sections of the web can be very regular. By virtue of such buffering, the retarding forces transmitted laterally through the thickness of the web to the driven sections of the web aligned with the disks are also uniformly maintained, so that regular treatment of these sections also occurs.

The precise position of the retarding fingers within each non-driving space 92 in the nip region will depend on the thickness of the web being processed and on the fineness of the microcreping desired. A thicker web will require a greater space between the opposed fingers and a smaller space will produce a finer microcrepe. The best position is determined by trials at different settings for a given web and desired treatment. Prior to feeding the leading edge of the web into the nip region, the spacing between the opposing contact faces of the retarder fingers may be temporarily reduced. That spacing can be opened up to its normal running size (which is larger than the nip) by driving the web into the nip region in which case the compacting web itself will force the fingers apart against the resilient opposition provided by the pneumatic cylinder 43 (FIG. 1). Also when operation is first begun, the spacing between the roll axes must be adjusted (by nuts 39, 41, FIG. 1) so that the height of the driving nips (k, FIG. 4) is of the proper size. In general, this is determined by reducing the spacing with the web present, until the web begins to drive, after which fine adjustments can be made.

Figure 6:
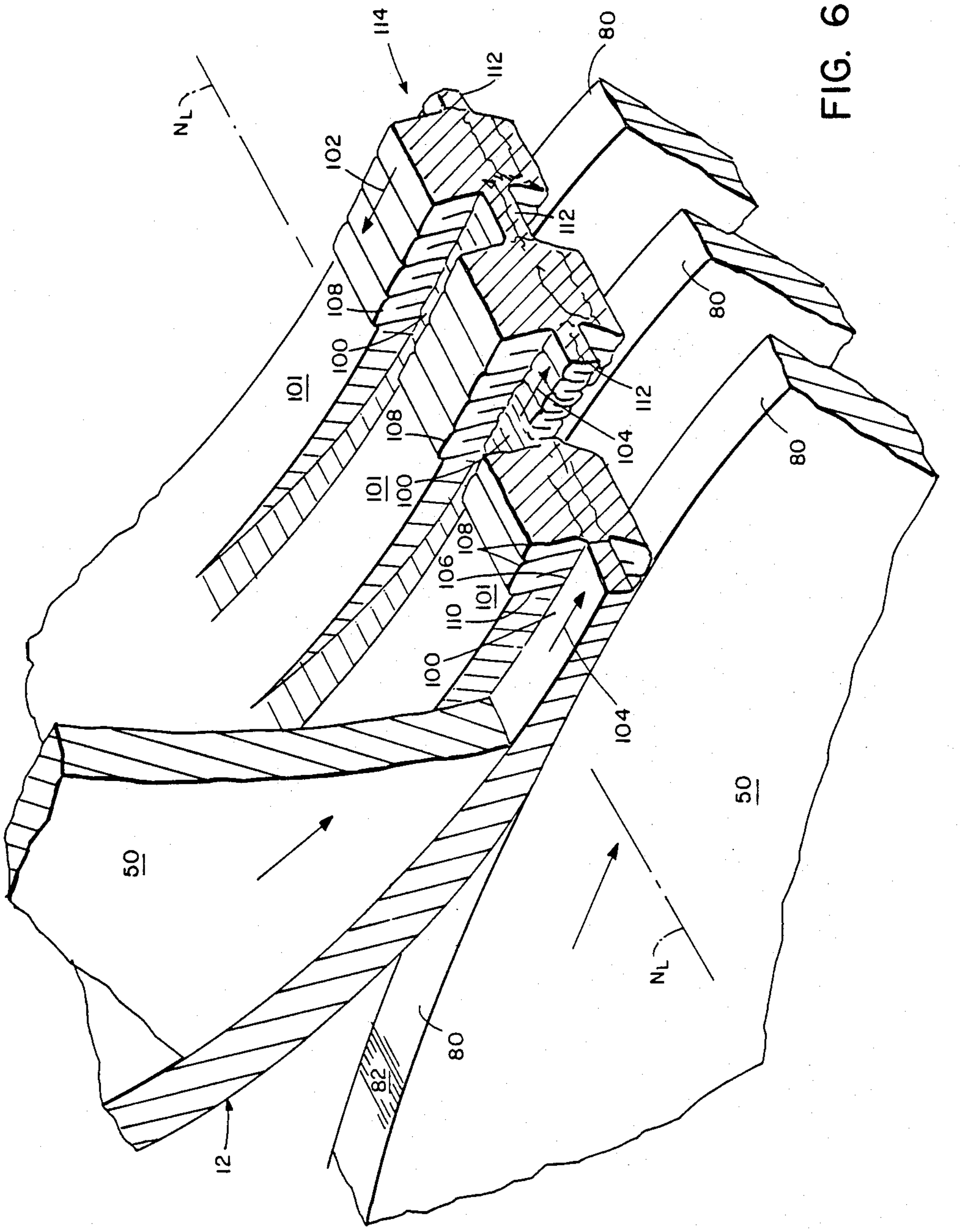
FIG. 6 is an isometric, diagrammatic and somewhat exaggerated cutaway view of a representative portion of a web in the vicinity of the nip of the machine.

Referring to FIGS. 4, 5, 6, in operation, web 12 is driven forward through the nip region toward the outfeed side along a series of narrow parallel strips (driven portions) 100. As web 12 reaches the nip region, the web is compressed facewise (perpendicular to the plane of the web) along strips 100 within driving nips 88. The friction surfaces (e.g. knurling 82) of the tracks 80 grip the compressed strips and drive them toward the outfeed side, arrows 104, FIGS. 5 and 6. At the same time the non-driven regions of the web that enter the non-driving spaces are free to remain relatively less compressed facewise (in the direction perpendicular to the web) because of the space available in the non-driving channels above and below the web. When the web reaches the retarding fingers 70, the driven strips 100 continue to be driven forward, by the driving force (arrows 104) but the non-driven regions 101 receive retarding forces (arrows 102) in the opposite direction to the driving forces. As mentioned above, forces 102 are imposed by virtue of the relationship of the surfaces of the retarding fingers to the corresponding face of the web. In the transition regions 106 between the driven strips 100 and the non-driven regions 101, the web transmits at least part of the driving forces indirectly to the non-driven regions which causes reorientation and compaction of the non-driven regions within the treatment cavities 109 that are defined by the retarding fingers. As the driving continues, the non-driven regions are compacted in the longitudinal direction of the web, and substantially reoriented.

The non-driven regions form a succession of tightly compressed undulations. Their outer portions at the faces of the webs are restrained due to frictional drag of the retarders while the inner portions are displaced forward due to the drive forces applied by the adjoining portions of the web. Thus the undulations in regions 101 take a distorted form, which can be referred to as lazy "U's", 108, as shown in FIG. 6. The vertical space between retarders 20, 22 provides an escape pathway for the compressed undulations such that the driving force transmitted from strips 100 propels them in succession between the retarders.

The compaction of the non-driven regions along the longitudinal direction of the web causes processed web 40 to be relatively shorter than the unprocessed web and to exit the outfeed side at a slower rate than it is pulled into the nip region. It is found that the entire web, both the driven strips 100 and the non-driven portions 101, is uniformly delivered at the outfeed side at the same rate and with the same degree of shortening. Just as the transition regions 106 of the web, under tension, transmit the driving forces from driven strips 100 to the non-driven regions 101 to accomplish compaction of regions 101, the transition regions, under the same tension, transmit the retarding forces 102 from the non-driven regions 101 to the driven strips 100. As the lazy "U's" 108 are formed in the non-driven regions, compaction and microcreping of the driven strips also occurs at the outfeed end to form a series of parallel transverse compressed microcrepes 112 of lesser height which may slope in the opposite direction.

Figure 7:
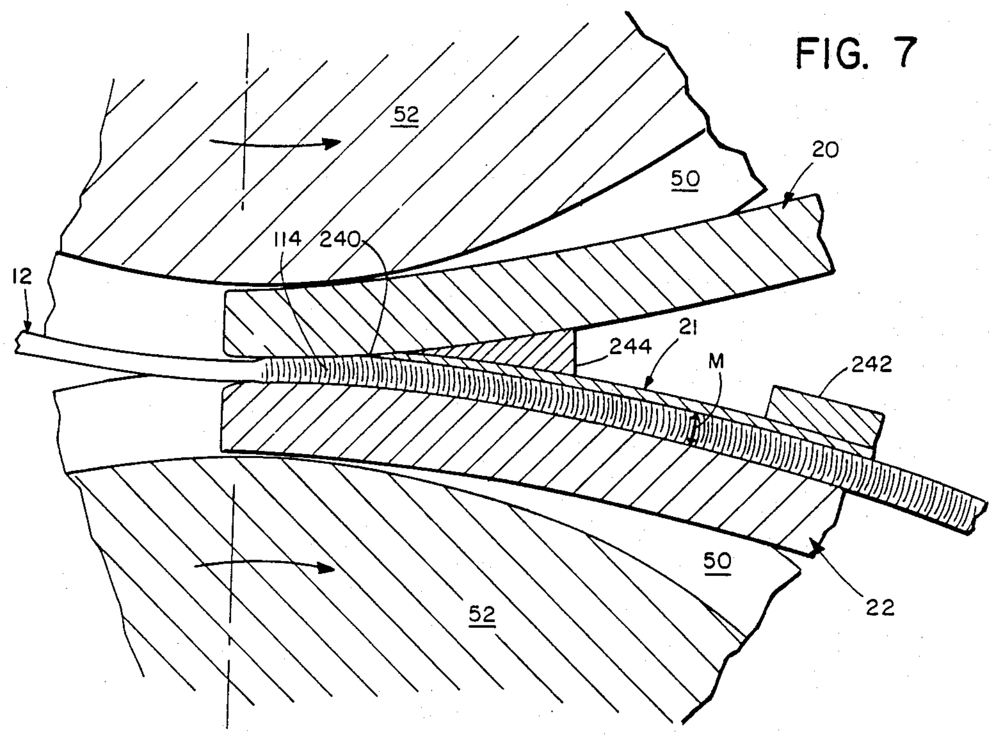
FIG. 7 is a side sectional view showing the dwell cavity of FIG. 1.

Referring to FIG. 7, as processed web 114 proceeds away from the nip it enters a dwell cavity defined between dwell plate 21 and retarder 22. Dwell plate 21 is attached to retarder 20 at weld line 240. Dwell plate 21 is given a slight downward curvature. This curvature is combined with adjustable weight 242, and a resilient wedge 244, to assure that the dwell cavity has a generally uniform depth M all along its length and that relatively even pressure is applied toward retarder 22 all along the length of the dwell cavity. During operation some of the heat generated in rolls 16, 18 is transferred to retarder 22 and plate 21 so that at their ends near the nip region they reach a desired working temperature sufficient to maintain the fibers of the processed web somewhat plastic without permanently damaging them. The temperature within the dwell cavity decreases with distance from the nip region. This decrease in heat combined with the slight, even pressure applied between retarder 22 and plate 21 helps to set the processed web. As a result, the processed web that exits the dwell cavity can be smooth and compact, with a desired degree of permanence even when the machine is operated at relatively high speed.

Retarder 22 and plate 22 may extend beyond the point where bracket 26 is attached, to make the dwell cavity even longer, to accomodate still higher speeds and provide a handy exit channel for the processed web.

The setting imparted by the dwell cavity minimizes the tendency of some types of processed web to expand facewise spontaneously, especially when processed at high speeds.

The web may be thick or thin, woven or non-woven. In the case of thick, non-woven webs, the processed web is both compacted longitudinally and compressed facewise relative to the unprocessed web.

Figure 8:
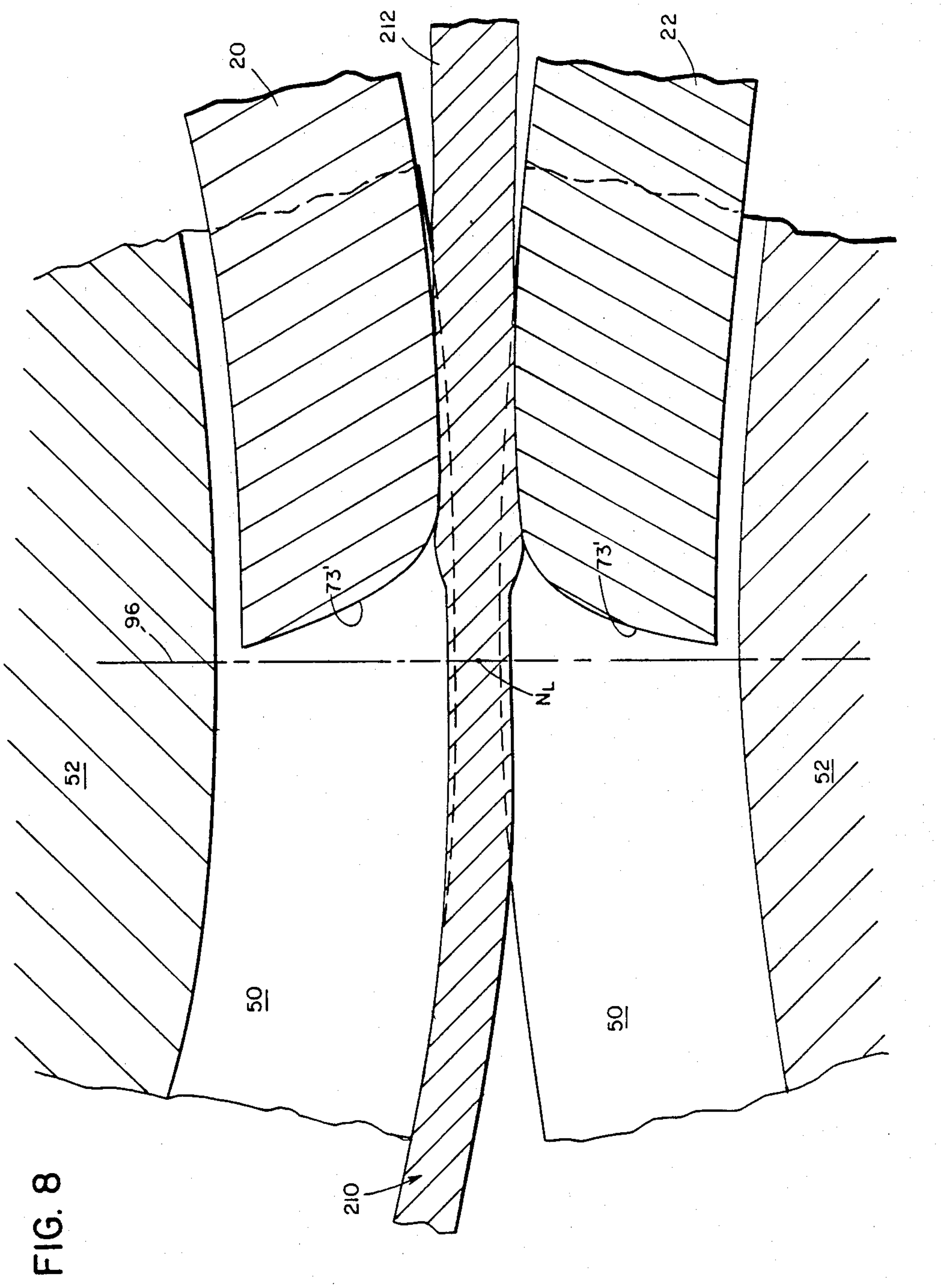

Referring to FIG. 8, when the web is a relatively thinner material 210, e.g. a woven or knit material, the spacing between the retarders may be reduced but still be left large enough so that the compression forces applied on the non-driven web regions are minimized consistent with the need to achieve retarding forces on those regions. Also the dwell cavity can be removed. In this way the hills and valleys formed intially in the web in the non-driven channels will remain substantially intact in the processed web 212. Also the fingers of the retarder may be terminated in tapered faces 73' which would tend to reduce the friction and may reduce tearing of the web. The ends of the fingers may lie on the outfeed side of the nip line $N_L$, as shown, spaced away as much, for instance, as ⅛" where the rolls have a radius of 2 inches.

Figure 9:
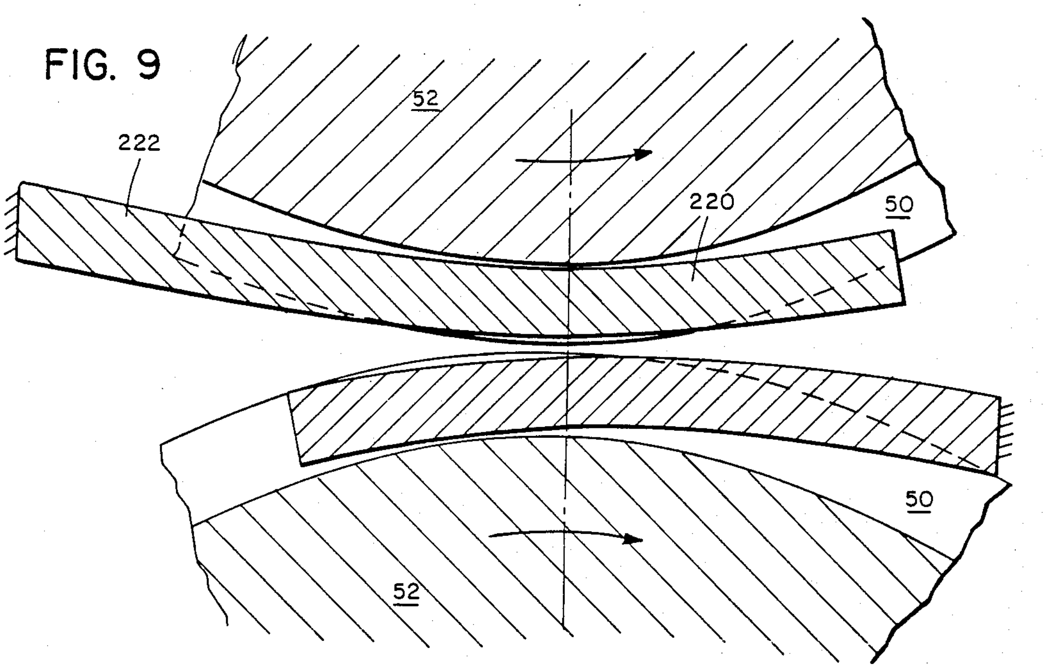
FIGS. 8 and 9 are diagrammatic side sectional views of alternate embodiments taken at the same position as 5—5 in FIG. 4.

Referring to FIG. 9, retarding fingers 220 could alternatively be supported from the infeed side of the nip using a long curved supporting member 222.

The non-driving spaces can be made even wider relative to the driving nips to further reduce the proportion of the web that is directly driven especially where the web has sufficient widthwise strength to withstand the triangulation of forces imposed. In other cases, the non-driving spaces can be narrower than the nips, or the spacing as well as the widths of the retarders can be varied across the width, all depending upon the character of the material being treated and the effects desired. Other configurations of retarding means can be used and retarders may be mounted for linear adjustment in and out and up and down as well as angularly. The rolls can be of different diameters and driven at different speeds to achieve the same or different surface speeds at the nip. The valleys in one roll can be deeper than the valleys in the other roll. The contact surfaces of the retarder fingers can be provided with a frictional surface, e.g. for materials that are difficult to retard. The pressure on the retarder fingers can be increased to achieve greater compaction.

The dwell cavity can be arranged so that the distance between the faces increases slightly with distance from the nip and/or so that the pressure between the faces decreases slightly with distance from the nip.

The retarders could be thinner (e.g., 0.020" blue steel or 0.125" brass), and the widths of the lands and valleys could be altered. The fingers of the retarders could bear against the peripheral surface of the smaller diameter disks.

One or both of retarders 20, 22 may be made resilient in the direction of arrow 77 (FIG. 3). A thin sheet of resilient metal (for example, blue steel in the range of 0.010 inches to 0.020 inches in thickness) is cut to have a row of fingers similar in length, width, and spacing to fingers 70. These resilient fingers overlie fingers 70 and are secured to retarders 20, 22 with screws 76, 78 respectively. The resilient fingers preferably have a slightly greater curvature than fingers 70 so that the tips of the resilient fingers meet upper surface 72 of rigid fingers 70 at a slight angle, thereby preventing the web from catching on the tips. The greater curvature also gives more resilience to the thin fingers. Alternately, one or both of retarders 20, 22 could be made entirely of the resilient metal to the same dimensions as discussed above with reference to FIGS. 3 and 4.

Other embodiments are within the following claims.

We claim:

1. An apparatus for longitudinally compressing a web under the influence of driving forces provided at a nip line defined by spaced-apart pairs of matched rotating disks and under the influence of retarding forces provided by sets of retarding fingers inserted in the spaces between the disks, wherein the retarding fingers of at least one set are associated with a yieldable support enabling movement of the fingers to positions respectively further apart and closer together dependently with increase and decrease in force applied to the fingers by the web, the fingers being constructed and arranged so that over the range of said positions of said fingers, in the downstream region close to the nip line, web-contacting surfaces of the sets of fingers diverge in the direction of travel of the web whereby, regardless of the position of said fingers, the longitudinally copressed web is always subjected to tightest constraint of its thickness at a point longitudinally close to the nip line, and downstream therefrom, while still confined, said corresponding sections of web are released from tightest constraint, said diverging surfaces promoting uniform movement of the corresponding oncoming sections of compressed web while enabling relatively steady retarding forces to be transmitted laterally through the web to retard the adjacent sections of the web that are in line with said disks, whereby the longitudinal compressive treatment of both the sections of the web in line with said fingers and the sections in line with said disks can be substantially regular.

2. The apparatus of claim 1 wherein at least one of the opposed surfaces of said sets of fingers is convexly curved in the region close to the nip line to provide divergence of those surfaces from the surfaces of the other set of fingers.

3. The apparatus of claim 2 wherein the opposed surfaces of both sets of the fingers are convexly curved in the region close to the nip line to contribute to the divergence of the surfaces of each set of fingers from the surfaces of the other set.

4. The apparatus of claims 2 or 3 wherein the radius of curvature of the surface of each of said convexly curved fingers is of the order of the radius of the disks alongside which each lies.

5. The apparatus claim 1 wherein fingers of at least one of said sets are structually supported from a point downstream of said nip, the said fingers protruding upstream therefrom, with their tips disposed entirely within the respective spaces, below the path of travel of the web.

6. The apparatus of claim 5 wherein both fingers of both said sets are mounted in the manner defined in claim 5.

7. The apparatus of claim 1 wherein, beginning at a region spaced downstream substantially from said nip line at which region the space between said fingers has widened relative to the tightest constraint so that the major portion of face-wide pressure upon the treated web has been relieved, there is defined an elongated dwell cavity in which the surfaces engaged with said web become substantially parallel.

8. An apparatus for processing a web of material comprising two side-by-side rolls rotating respectively in opposite directions about two spaced apart axes, each roll having larger diameter segments and smaller diameter segments along its length, said larger and smaller diameter segments of said two rolls being matched to form a series of relatively shallow driving nips along a nip line alternating with relatively deep non-driving spaces, said larger diameter segments imposing face-to-face compressive forces and longitudinal driving forces on the corresponding regions of said web which pass through said nips, regions of said web which pass through said non-driving spaces being driven indirectly by said larger diameter roll segments acting via forces transmitted through the substance of the web from said directly driven web regions to said non-directly driven web regions, and closely disposed retarding means in the form of pairs of generally divergent fingers slidably engaging the web, located to apply longitudinal retarding forces on both faces of the non-directly driven regions of said web immediately as they emerge from the nip line, said retarding forces having the opposite direction to said driving forces, and producing immediate, continual shortening of the emerging web, the shortened web thereupon subject to a zone of less constraint, said non-driving spaces adjacent said web permitting reorientation of said non-directly driven web regions during said shortening with less face-to-face compression than the face-to-face compression applied to the driven web regions, said driven web regions being retarded indirectly by said closely disposed, divergent fingers acting via forces transmitted through the substance of the web from said non-directly driven web regions, to cause said driven web regions to undergo their immediate regular longitudinal shortening, at least one finger of each pair of said fingers being adjustable further apart and closer together relative to the other finger of the pair, the fingers being constructed and arranged so that in the downstream region close to the nip line, regardless of the adjusted position of said fingers, said fingers diverge in the downstream direction, whereby the web is always subjected to tightest contraint in the direction of its thickness at a point longitudinally close to the nip line.

9. The apparatus of claim 8 wherein each said larger diameter segment has a peripheral driving surface that is narrower in width measured in the axial direction of the roll than the width of the space between said peripheral driving surface and the peripheral driving surface of the next adjacent larger diameter segment.

10. The apparatus of claim 9 wherein said peripheral driving surface has a width that is about one half of or less than the width of said space.

11. The apparatus of claim 8 or 9 wherein the width of said spaces is about 0.10 inch.

12. The machine of claim 11 wherein the width of said peripheral driving surfaces is about 0.05 inch or less.

13. The apparatus of claim 8 wherein a said larger diameter segment has a peripheral driving surface which bears an enhanced friction treatment.

14. The apparatus of claim 8 wherein a said larger diameter segment includes a cylindrical peripheral driving surface that is narrower in the axial direction than the full axial width of said larger diameter segment, and a pair of tapered shoulders on opposite sides of said driving surface.

15. The apparatus of claim 14 wherein said shoulders are smooth and said driving surface bears an enhanced friction treatment.

16. The apparatus of claim 13 or 15 wherein said enhanced friction treatment comprises lines of knurling that lie at substantial angles to the direction of travel of said driving surface.

17. The apparatus of claim 13 or 15 wherein said enhanced friction treatment comprises plasma coating of fine abrasive particles.

18. The apparatus of claim 8 further comprising means for maintaining said rolls with a constant distance between said axes.

19. The apparatus of claim 8 wherein said retarding means comprises stationary, cantilevered finger-form retarders each having a surface exposed for contact with a face of one said non-directly driven web regions, said surface having an extent along the length of said rolls less than the space between corresponding adjacent larger diameter segments.

20. The apparatus of claim 19 wherein each said finger-form retarder rests within one of said non-driving spaces of one said roll and includes a second surface opposite said web contacting surface, said second surface being spaced away from the peripheral surface of said smaller diameter segment.

21. The apparatus of claim 19 wherein on each side of said web there are finger-form retarders which are integral, upstream extensions of a respective continuous element which extends across the width of the web, said finger-form retarders of each said element being interdigitated in the non-driving spaces respectively of the corresponding roll, said contact surfaces of said two elements being separated by a space, during operation, to permit passage of said non-directly driven portions of said web.

22. The apparatus of claim 21 wherein during operation said retarders are held at substantially fixed distances from the plane on which said axes lie.

23. The apparatus of claim 21 wherein said retarders are relatively rigid in the direction perpendicular to the faces of the web.

24. The apparatus of claim 19 wherein said finger-form retarders are supported by means permitting slight resilient yielding in the longitudinal direction of the position of the fingers during initial feeding of the web into the machine during start-up.

25. The apparatus of claim 19 wherein both sets of said finger-form retarders are supported from the outfeed side of the machine.

26. The apparatus of claim 8 including means defining a slidable pathway for passage of web after it has been shortened and reoriented, said pathway being thereafter sufficiently shallow to apply a degree of face-to-face compressive force to said reoriented and compacted non-directly driven web regions as they pass via said pathway.

27. The apparatus of claim 8 or 21 including means defining a slidable pathway for passage of web after it has been shortened and reoriented, said pathway being sufficiently deep so as to minimize face-to-face compressive forces applied to said non-directly driven web regions as they pass via said pathway.

28. The apparatus of claim 8 further comprising
a dwell cavity for receiving said web, said cavity being located on the outfeed side of said nip beyond the place where said longitudinal shortening occurs, said cavity comprising a pair of cavity faces.

29. The apparatus of claim 28 wherein a uniform or increasing distance between said faces is maintained along the length of said dwell cavity away from said nip.

30. The apparatus of claim 29 further comprising means for providing a temperature differential along said dwell cavity faces, with higher temperatures nearer said nip.

31. The apparatus of claim 28 further comprising means for applying face-to-face pressure along the length of said dwell cavity, said pressure being even or decreasing with distance from said nip.

32. The apparatus of claim 28 wherein one said face is a continuation of a slidable retarding surface, and the other said face comprises a plate attached to a member supporting a slidable retarding surface on the opposite side of the web.

* * * * *

UNITED STATES PATENT AND TRADEMARK OFFICE

CERTIFICATE OF CORRECTION

PATENT NO. : 4,859,169

DATED : August 22, 1989

INVENTOR(S) : Walton, et al.

It is certified that error appears in the above-identified patent and that said Letters Patent is hereby corrected as shown below:

Col. 1, line 15, delete "spaced" and insert --spaces--;
Col. 1, line 18, delete "has" and insert --had--;
Col. 1, line 45, delete "engges" and insert --engages--;
Col. 2, line 52, delete "abut" and insert --about--;
Col. 3, line 4, delete "sjubect" and insert --subject--;
Col. 3, line 40, delete "sruface" and insert --surface--;
Col. 5, line 16, delete "24" and insert --34--;
Col. 5, line 44, delete "(3¼)" and insert --(3 1/4")--.
Col. 6, line 38, after "cylindrical" and before "," delete the extra space;
Col. 7, line 7, after "configurations" delete "a";
Col. 9, line 1, after "plate" delete "22" and insert --21--;
Col. 9, line 27, delete "1/8" and insert --3/4--;
Col. 10, line 5, delete "resilience" and insert --resiliency--;
Col. 10, claim 7, line 67, delete "wide" and insert --wise--;
Col. 11, claim 12, line 66, delete "machine" and insert --apparatus--.

Signed and Sealed this

Nineteenth Day of March, 1991

*Attest:*

HARRY F. MANBECK, JR.

*Attesting Officer* *Commissioner of Patents and Trademarks*